United States Statutory Invention Registration [19]

[11] Reg. Number: H863

Kwiedorowicz et al. [43] Published: Jan. 1, 1991

[54] CHEMICAL PROTECTIVE HOOD

[75] Inventors: Laurie A. Kwiedorowicz, Baltimore, Md.; Steven W. Ennis; Douglas A. Durney, both of Dover, Del.

[73] Assignee: The United States of America as represented by the Secretary of the Army, Washington, D.C.

[21] Appl. No.: 556,919

[22] Filed: Jul. 24, 1990

[51] Int. Cl.[5] ..... A42B 1/08; A62B 17/04

[52] U.S. Cl. ..... 2/424; 128/201.23; 128/201.25

*Primary Examiner*—Linda J. Wallace

*Attorney, Agent, or Firm*—Anthony T. Lane; Edward Goldberg; Michael C. Sachs

[57] ABSTRACT

A chemical protective hood is made of nylon/butyl cloth and assembled using at butt and tape method of construction with the joints thereof covered by nylon/-butyl tape. The hood has a cap portion with a face piece opening in which is mounted a butyl/natural rubber face piece in sealed relationship with the cap portion. The face piece includes eye lens ports, a voicemitter port and a canister port to accommodate projecting portions of an underlying gas mask. The face plate is elastic and elastically seals with the projecting portions of the face mask. The collar portion extends down from the cap portion and includes an elastic band for slightly constricting the neck portion while a cape portion projects down from the neck portion and includes a pair of underarm straps having elastic portions for holding the cape portion in place. VELCRO piles are attached to the collar portion and cape portion for securing the cape portion up when it is desired to provide some ventilation under the hood.

7 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

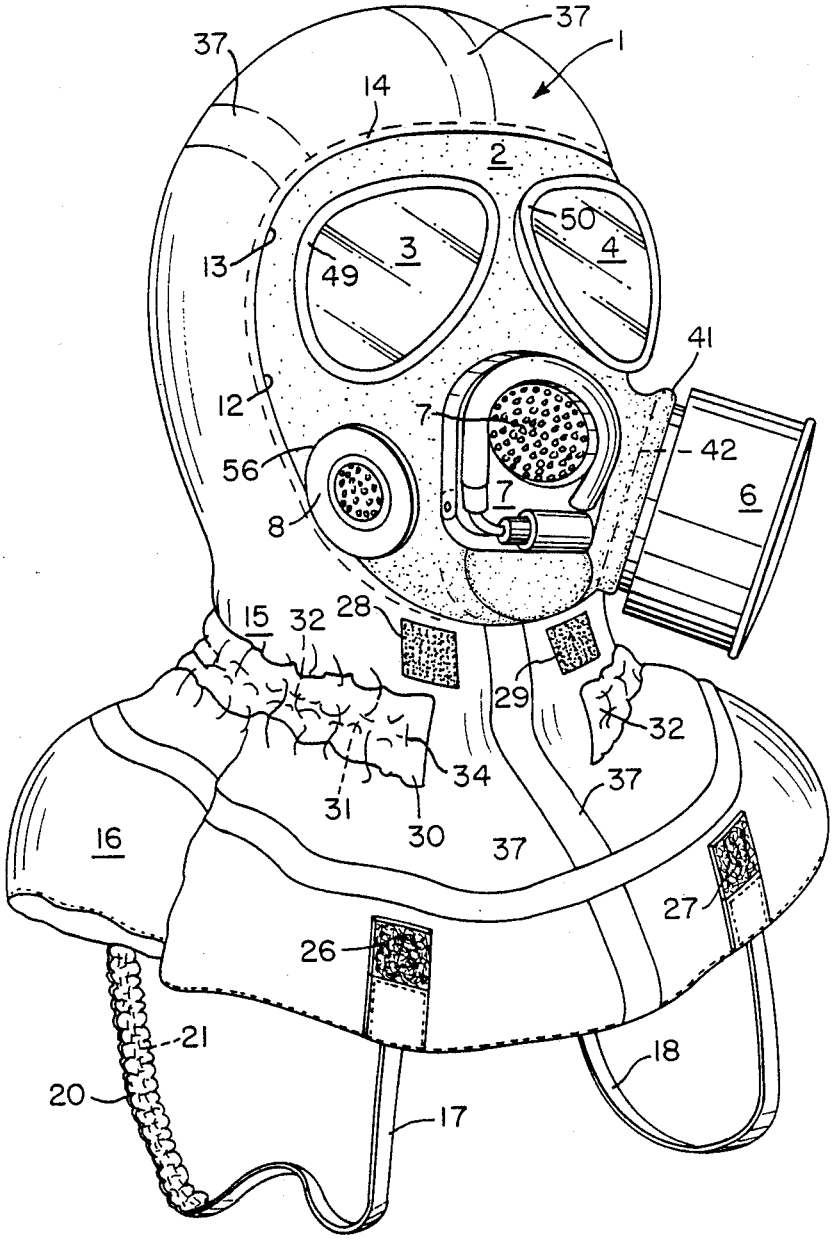
37
37
1
14
2
50
4
3
13
49
41
12
7
42
56
7
6
8
15
32
28
29
32
34
37
31
30
37
16
27
26
21
18
20
17

CHEMICAL PROTECTIVE HOOD

GOVERNMENTAL INTEREST

The invention described herein may be manufactured, used, and licensed by or for the Government for Government purposes without payment to me of any royalties thereon.

BACKGROUND OF THE INVENTION

The instant invention relates to chemical protective hoods which are worn over gas masks, more particularly, this invention is directed to chemical protective hoods which are especially suitable for military applications and also have utility in civil emergency situations where highly toxic substances are in the atmosphere.

In the past, most chemical protective hoods have been constructed solely of nylon/butyl cloth. Over the years, a number of minor modifications have been made to the hood to enhance the doffing ability of the hood. For example, the eye lens and voicemitter openings have been elasticized to make the hood generally more flexible. In addition, a number of zippers and drawstrings have been added to the hood, however, these increase the complexity of the hood and the amount of time consumed in removing the hood. It is very important that one be able to quickly doff a chemical protective hood because there are numerous situations in which chemical hoods are donned when risk is very low. If removing a hood becomes burdensome, then soldiers and others who might don a hood in a low risk situation will simply not bother because the hood will be thereafter difficult or irritating to remove. In addition to doffing problems, currently available hoods do not provide flammability protection and are deficient in liquid agent protection due to the materials of which the hoods are made.

In view of the aforementioned difficulties of presently utilized chemical protective hoods, there is a need for a new and improved chemical protective hood.

SUMMARY OF THE INVENTION

It is an object of the instant invention to provide a new and improved chemical protective hood which is convenient to use in that it has enhanced doffing properties and is safer in that it offers flammability protection and increased resistance to chemical agents.

In view of these objects and other objects, the instant invention contemplates a chemical protective hood having a cap portion with a face piece opening in which is received a face piece having a periphery to which the cap portion is fixed in sealed relation. Depending from the cap portion is a collar portion which surrounds the wearer's neck and depending from the collar portion is a cape portion which fits over the wearer's shoulders. A pair of straps having front and rear ends are secured to the cape portion adjacent the bottom edge thereof and loop underneath the wearer's arms. The collar portion includes slot extending therearound in which is received an elastic member so that the collar is slightly constricted about the neck of the wearer.

Frequently it is desirable to ventilate the hood without completely doffing the hood. In accordance with the instant invention, the collar portion is equipped with loop patches of VELCRO material which are secured to hook patches of VELCRO material in the collar area so that the cape portion may be held up.

The hood is comprised of a relatively heavy nylon/-butyl cloth such as Greengate No. 3183 with the pattern pieces held together using the butt and tape method of construction wherein the material comprising the tape is of the same fabric as that of the hood. The face plate is made of a 70/30 butyl/natural rubber material which is bonded to the fabric by a Mil-standard butyl adhesive.

In order to provide for quick removal of the hood over the gas mask canister, a plastic ring is provided over the neck of the canister. The ring stretches the side port opening of the face piece so as to avoid the necessity for a long, heavy-duty zipper to facilitate doffing of the hood.

BRIEF DESCRIPTION OF THE DRAWING

Various other objects, features and attendant advantages of the present invention will be more fully appreciated as the same becomes better understood when considered in conjunction with the accompanying drawing, in which like reference characters designate the same or similar parts, and wherein:

The FIGURE is a prospective view of a chemical protective hood configured in accordance with the principles of the instant invention.

DETAILED DESCRIPTION

Referring now to the FIGURE, there is disclosed a chemical protective hood, designated generally by the numeral 1, which fits over a gas mask portions of which project through a face piece portion 2 of the hood. Projecting portions of the gas mask include eye lenses 3 and 4, a canister 6, a voicemitter 7 and a vent 8. Since they must fit over gas masks, chemical protective hoods can be difficult to remove or doff once they are donned. The hood 1 minimizes doffing efforts.

The chemical protective hood 1 is designed primarily for military applications, but is of interest in any situation where people are exposed to highly toxic substances. The hood 1 is comprised of a cap portion 11 having an opening 12 for receiving the face piece 2. The face piece 2 is sealed completely around its periphery 14 to the border of the opening 12.

Extending from the cap portion 11 of the hood 1 is neck portion 15 and extending from the neck portion is a cape portion 16. The cape portion 16 drapes over the wearer's shoulders and is held in place by a pair of underarm straps 17 and 18 which are attached to the periphery 19 of the cape portion 16. The straps 17 and 18 are each made of tubular fabric material and each include an elastic portion 20 which has an elastic band or bungi 21 extending therein. The bungi 21 is anchored at its ends and is freely slidable in the tube. The elastic portions 20 of the fabric tubes 17 and 18 are approximately 9 inches long while the bungi, when in a relaxed state, is approximately 8 inches long.

In order to allow the person wearing the hood to retain the hood in place while ventilating the hood, first and second VELCRO patches 26 and 27 are secured to the cape portion 16 so that the cape portion can be pulled up and adhered to VELCRO hook patches 28 and 29 on the upper portion of the collar 15 just beneath the face piece 13. In prior art hoods, ventilation is accomplished by a zipper extending from the lower periphery of the mask up to the face piece.

Prior art protective hoods are secured about the wearer's neck with a drawcord which at times can be difficult to loosen and in any event require an extra manipulative step prior to doffing the hood. The hood 1 of the instant invention utilizes channel 30 formed in the collar portion 15 in which an elastic member or bungi 31 is secured only adjacent its ends 32 and 33 so as to hold the collar portion gathered about the wearer's neck. When the wearer decides to doff the hood 1 he no longer needs to first loosen drawstrings, all he need do is pull the hood from around his head while peeling it from over the face piece 2.

Preferably, the cap portion 11, neck portion 15 and cape portion 16 are integral and made of a relatively heavy grade nylon/butyl cloth material known as Greengate No. 3183 with the pattern pieces held together using a butt and tape method of construction. The tape 37 used to join the pattern pieces is also made of Greengate No. 3183 material. Greengate No. 3183 provides 45 to 60 minutes of liquid agent resistance and also provides improved durability due to the tough base material of ripstop nylon and the butyl curing process.

The face piece 2 is made of a 70/30 butyl/natural rubber material which is bonded to the fabric along the seam 12 by a Mil-standard butyl adhesive. The face piece 2 is designed to fit the currently used XM40 gas mask but can be conveniently redesigned to fit other gas mask configurations. The 70/30 butyl/natural rubber material of which the face piece 2 is made possesses a moderate to good memory having 80–95% recovery. Its properties were determined during tests in which the material was stretched and relaxed over two week time periods in various environments.

In order to accommodate the canister 40 of the gas mask, the face piece 2 has a canister/side port 41 through which the canister projects. The side port 41 provides a tight seal between the canister 40 and the face piece 2, while the hood 1 is worn. The opening 41 has an elastic periphery and is stretched around a plastic ring 42 which fits over the neck (not shown) of the canister between the canister and the opening. The ring 42 keeps the side port 41 substantially open so that upon doffing the hood 1 the hood can be pulled quickly over the canister 40 since the opening is already stretched.

The face piece 2 also includes openings 45 and 46 which provide eye lens ports 47 and 48 for the eye lenses 3 and 4 of the gas mask. A lens bead of a 0.095 inch radius is provided around the eye lens port 47 and 48 so that the elastic material of the face piece 2 seals elastically around the rims 49 and 50 of the lens pieces 3 and 4. In addition, an opening 53 is provided in the face piece for the voicemitter 7 of the gas mask, the opening 53 having an interface bead of a 0.040 inch radius so as to fit snugly against the sides of the voicemitter. Finally, the face piece 2 includes a circular opening 56 therein through which the exhaust vent 8 on the gas mask projects. The face piece 2 elastically interfaces with the exhaust vent 57 so as to seal thereagainst. The enhanced elasticity of the face piece 2 allows the wearer to readily strip the face plate away from the mask when doffing the hood 1.

From the foregoing description, one skilled in the art can easily ascertain the essential characteristics of this invention, and without departing from the spirit and scope thereof, can make various changes and modifications of the invention to adapt it to various usages and conditions.

The entire disclosures of all applications, patents and publications, if any, cited above and below, are hereby incorporated by reference.

What is claimed is:

1. A chemical protective hood comprising:

a cap portion with a face piece opening therein;

a collar portion integral with and depending from the cap portion, the collar portion having elastic means associated therewith for constricting the collar portion by gathering the collar portion;

a cape portion for extending over the shoulders of the wearer, the cape portion having a pair of underarm straps secured thereto, the straps having elastic means for allowing the straps to stretch, and a face piece secured within the opening in the cap portion, the face piece being made of an elastic material and having openings therethrough for receiving projecting portions of a gas mask worn underneath the protective hood.

2. The chemical protective hood of claim 1, further including adhesive means secured to the collar portion and to the cape portion for securing the cape portion releasably to the collar portion wherein the cape portion can be lifted and secured to the collar portion for ventilating the inside of the chemical protective hood.

3. The chemical protective hood of claim 1, wherein the hood is made of nylon/butyl cloth with pattern portions of the hood held together in abutment by tape made of the same fabric as the hood.

4. The chemical protective hood of claim 1, wherein the face piece is made of 70/30 butyl/natural rubber material and wherein the face piece is bonded to the periphery of the opening in the cap portion.

5. The chemical protective hood of claim 4, wherein the gas mask over which the chemical protective hood fits has a canister with a neck projecting therefrom; wherein the face piece has a port through which the canister passes, and wherein a ring is secured around the neck of the canister to define a shoulder which the periphery of the port in the face piece engages.

6. The chemical protective hood of claim 5, further including a pair of eye lens ports through which the eye lenses of the gas mask project and a voicemitter port through which a voicemitter of the gas mask projects, each of the ports having a peripheral bead extending therearound for elastic, sealing engagement with the projecting eye lenses and voicemitter of the gas mask.

7. The chemical protective hood of claim 1, wherein the underarm straps are each single piece members having ends which are secured adjacent the periphery of the cape portion, the straps being tubular and having elastic members secured at both ends thereof within the straps.

* * * * *